US011714009B2

(12) United States Patent
Woolstenhulme et al.

(10) Patent No.: US 11,714,009 B2
(45) Date of Patent: Aug. 1, 2023

(54) ULTRASONIC SENSORS AND METHODS OF USING THE ULTRASONIC SENSORS

(71) Applicant: Battelle Energy Alliance, LLC, Idaho Falls, ID (US)

(72) Inventors: Nicolas E. Woolstenhulme, Idaho Falls, ID (US); Joshua Daw, Idaho Falls, ID (US); Colby B. Jensen, Ammon, ID (US); James R. Parry, Idaho Falls, ID (US); Lance A. Hone, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 804 days.

(21) Appl. No.: 16/582,914

(22) Filed: Sep. 25, 2019

(65) Prior Publication Data

US 2020/0096482 A1    Mar. 26, 2020

Related U.S. Application Data

(60) Provisional application No. 62/736,770, filed on Sep. 26, 2018.

(51) Int. Cl.
*G01N 29/24* (2006.01)
*G01N 29/22* (2006.01)
(Continued)

(52) U.S. Cl.
CPC .......... *G01K 11/22* (2013.01); *G01N 29/221* (2013.01); *G01N 29/2462* (2013.01); *G21C 17/10* (2013.01)

(58) Field of Classification Search
CPC .. G01K 11/22; G01N 29/221; G01N 29/2412; G01N 29/07; G01N 29/2437; G01N 29/326; G21C 17/10
(Continued)

(56) References Cited

U.S. PATENT DOCUMENTS 6,296,385 B1 * 10/2001 Balasubramaniam ......................
G01N 11/16
374/142
6,846,689 B2 * 1/2005 Forchel ..................... H01S 5/12
372/49.01
(Continued)

FOREIGN PATENT DOCUMENTS

WO    WO-2016178981 A1 * 11/2016 ............. G01K 11/22

OTHER PUBLICATIONS

Structural Engineering and Mechanics, vol. 17, No. 3-4 (2004) 000-000On magnetostrictive materials and their use in adaptive structures, Dapino, Aug. 30, 2003. (Year: 2003).*
(Continued)

*Primary Examiner* — Jacques M Saint Surin
(74) *Attorney, Agent, or Firm* — TraskBritt

(57) ABSTRACT

An ultrasonic sensor comprises a transducer in operable communication with a power source, a waveguide comprising a metal and at least one of a fissile material or a fertile material in operable communication with the transducer and configured to propagate and reflect acoustic waves generated by the transducer, the transducer configured to convert reflected acoustic waves to an electric signal, a thermally insulative material proximate the waveguide, and a control system in operable communication with the transducer, the control system configured to determine at least a temperature of the waveguide based on the reflected acoustic waves. Related methods are also disclosed.

20 Claims, 2 Drawing Sheets

(51) Int. Cl.
*G01K 11/22* (2006.01)
*G21C 17/10* (2006.01)

(58) Field of Classification Search
USPC .......................................................... 374/117
See application file for complete search history.

(56) References Cited

U.S. PATENT DOCUMENTS

| | | | |
|---|---|---|---|
| 10,481,288 B2* | 11/2019 | Chang | B06B 1/0644 |
| 10,794,870 B2* | 10/2020 | Balasubramaniam | |
| | | | G01N 29/024 |
| 11,237,135 B2* | 2/2022 | Xiang | G01N 29/343 |
| 2010/0226580 A1* | 9/2010 | Frank | G06K 9/00543 |
| | | | 382/209 |

OTHER PUBLICATIONS

Daw, "Development and Demonstration of Thin Waveguide Ultrasonic Thermometer", A Dissertation Presented in Partial Fulfillment of the Requirements for the Degree of Doctor of Philosophy with a Major in Mechanical Engineering in the College of Graduate Studies University of Idaho (May 2015) 149 pages.

* cited by examiner

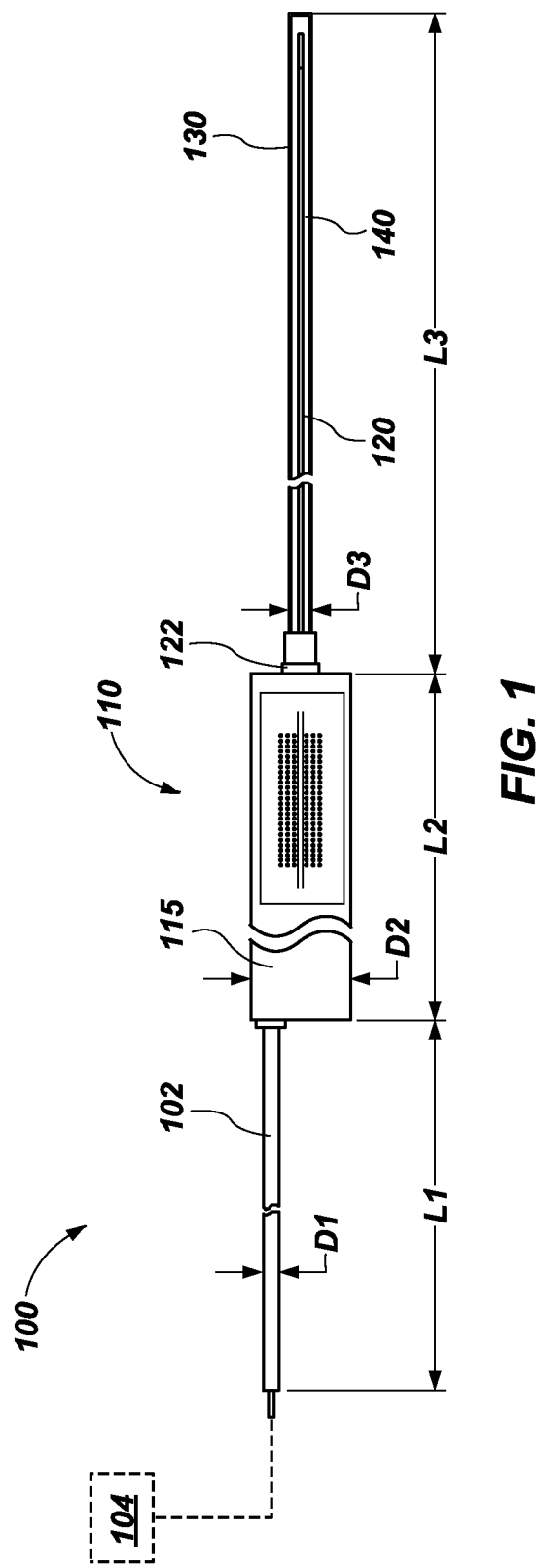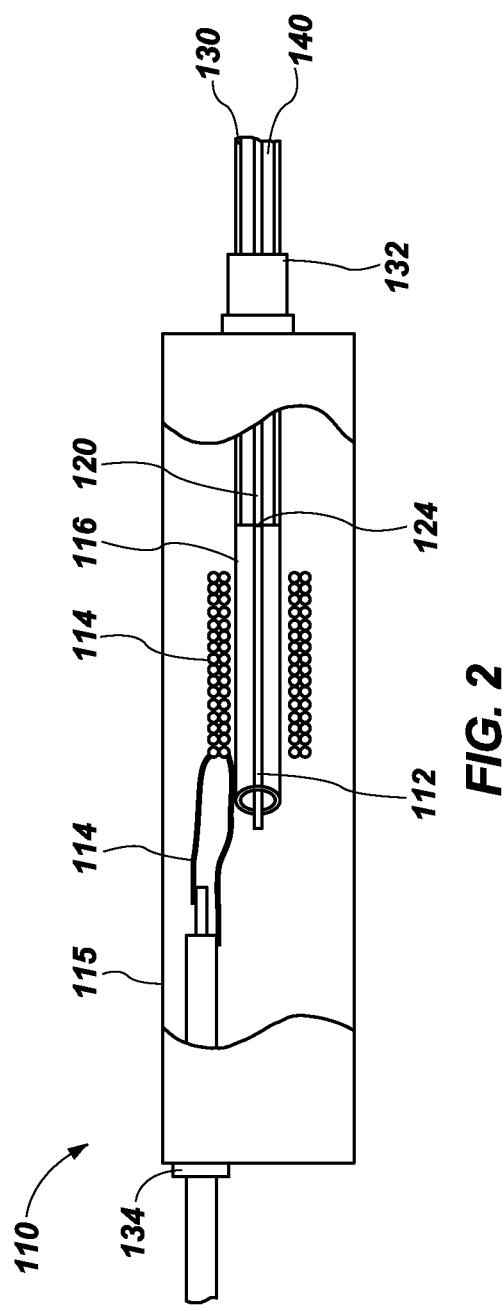

ULTRASONIC SENSORS AND METHODS OF USING THE ULTRASONIC SENSORS

CROSS-REFERENCE TO RELATED APPLICATION

This application claims the benefit under 35 U.S.C. § 119(e) of U.S. Provisional Patent Application Ser. No. 62/736,770, filed Sep. 26, 2018, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to ultrasonic sensors for measuring one or more conditions within a nuclear reactor core, and to related methods. More particularly, embodiments of the disclosure relate to ultrasonic sensors for measuring a neutron flux, neutron spectra, alpha decay, beta decay, gamma decay, or other conditions within a nuclear reactor core, and to related methods of measuring such properties.

BACKGROUND

Measurement of nuclear properties, such as neutron flux and neutron spectra, is conducted with various instruments, such as with an activation foil, a flux wire, or a dosimeter. For example, activation foils and flux wires may be inserted into a reactor core to measure a reactor neutron flux profile. The activation foil or flux wire is inserted into the reactor core for a length of time required for activation of the foil or flux wire to a desired level. After activation, the activation foil or flux wire is removed from the reactor core and the activity thereof is measured. However, such methods of measuring neutron flux assume that the neutron flux is constant (i.e., that the reactor core is operating under steady state conditions). Accordingly, such methods are not suitable for measuring neutron flux in real time or during transient reactor conditions.

Other conventional methods of measuring neutron flux include use of a classical radiation dosimeter. For example, a thermoluminescent dosimeter (TLD) includes crystals of a solid state material that traps electrons produced from gamma interactions in imperfections in the lattice structure of the crystals. When the crystals are heated, the trapped electrons are released from their traps and fall back into their ground state, releasing visible-spectrum light photons. The amount of light produced can be measured with a photodetector, such as a photomultiplier tube. The total light given off and the glow curve of the dosimeter may be used to determine the gamma doses received by the dosimeter crystal. However, TLDs do not directly measure gamma heating or the amount of fission heating deposited in the dosimeter. Further, dosimeter-type measurements must balance considerations such as decay time, shipment, dose rate, dosimeter quantity and size, and isotopes of interest. Accordingly, dosimeter-type measurements are not ideally refined, calibrated, accurate, or timely. Dosimeter-type measurements also cannot determine time-dependent nuclear heating. As such, dosimeters are not suitable for measurement during transient reactor conditions.

BRIEF SUMMARY

Embodiments disclosed herein include ultrasonic sensors for measuring one or more conditions within a nuclear reactor core, and to related methods. For example, in accordance with one embodiment, an ultrasonic sensor comprises a transducer in operable communication with a power source, a waveguide comprising one or more of at least one metal, at least one fissile material, and at least one fertile material in operable communication with the transducer and configured to propagate and reflect acoustic waves generated by the transducer, wherein the transducer is configured to convert reflected acoustic waves to an electric signal, a thermally insulative material proximate the waveguide, and a control system in operable communication with the transducer, the control system configured to determine at least a temperature of the waveguide based on the reflected acoustic waves.

Additional embodiments are directed to a method of measuring at least one nuclear property within a reactor core, the method comprising pulsing acoustic waves from a transducer through a waveguide comprising one or more of at least one metal, at least one fissile material, and at least one fertile material, measuring at least one reflected acoustic wave reflected by the waveguide, and determining a temperature of the waveguide based at least in part on a duration between sequential reflected acoustic waves received by the transducer.

In further embodiments, an ultrasonic sensor for determining one or more conditions within a nuclear reactor comprises a waveguide comprising one or more materials formulated and configured to exhibit a change in temperature responsive to exposure to one or more of neutrons, alpha particles, beta particles, and gamma particles, a transducer coupled to the waveguide, and a control system coupled to the transducer and configured to determine a temperature of the waveguide.

BRIEF DESCRIPTION OF THE DRAWINGS

FIG. 1 is a simplified schematic of an ultrasonic sensor, in accordance with embodiments of the disclosure;

FIG. 2 is a simplified schematic of a transducer, in accordance with embodiments of the disclosure.

DETAILED DESCRIPTION

Figure 3:
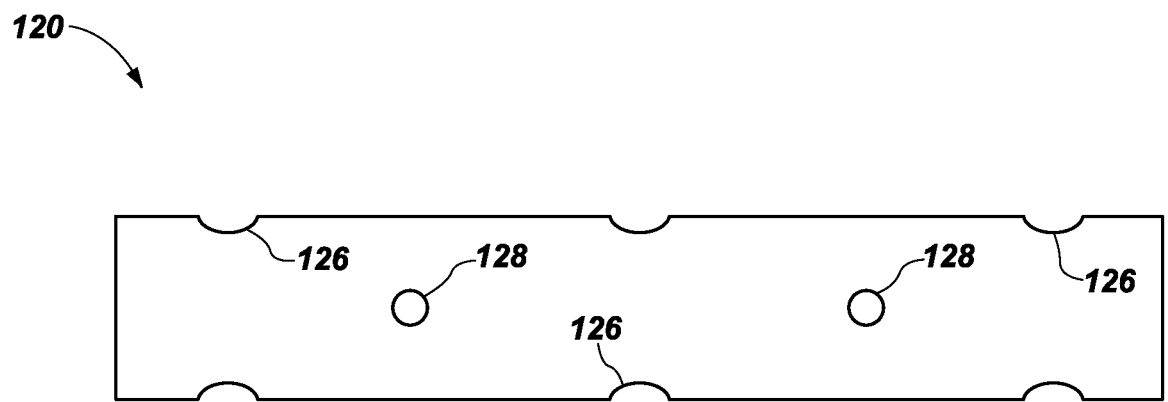
FIG. 3 is a simplified longitudinal cross-sectional view of a waveguide, in accordance with embodiments of the disclosure.

Illustrations presented herein are not meant to be actual views of any particular material, component, or system, but are merely idealized representations that are employed to describe embodiments of the disclosure. Further, any drawings accompanying the present application are for illustrative purposes only and, thus, are not drawn to scale. Additionally, elements common between figures may retain the same numerical designation.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details.

Indeed, the embodiments of the disclosure may be practiced in conjunction with conventional fabrication techniques employed in the industry. In addition, the description provided below does not form a complete description of an ultrasonic sensor, or a nuclear reactor core including the ultrasonic sensor, or a complete description of use of the ultrasonic sensor. Only those process acts and structures necessary to understand the embodiments of the disclosure are described in detail below. Additional acts to form an ultrasonic sensor, a reactor core including an ultrasonic sensor, or a component of an ultrasonic sensor may be performed by conventional techniques.

According to embodiments described herein, an ultrasonic sensor is configured to measure properties of a nuclear reactor core (also referred to herein as a reactor core), such as a neutron flux and neutron spectra, within the reactor core in real time. The ultrasonic sensor is configured to determine one or more properties of the reactor core during both steady state operation of the reactor core and transient reactor core conditions. In some embodiments, the ultrasonic sensor may be configured to determine one or more different types of radiation (e.g., neutron radiation, gamma radiation). At least a portion of the ultrasonic sensor may be disposed within the nuclear reactor core and configured to measure at least one property of the reactor core.

The ultrasonic sensor may include an ultrasonic transducer, such as an ultrasonic transceiver, configured to convert electrical signals into ultrasound and further configured to convert received ultrasound signals into electrical signals. A waveguide may be in operable communication with the transducer. The transducer may send acoustic pulses to the waveguide, which may be configured to propagate ultrasonic (e.g., sound) waves therethrough, wherein the acoustic waves are reflected at various locations along the waveguide. The waveguide may comprise a wire comprising one or more materials that may be heated by nuclear heating (e.g., fission heating, decay heating, such as gamma heating). For example, the wire may comprise a metal alloyed with a nuclear fuel material, such as a transuranic material (e.g., uranium-235, plutonium-239, thorium-232). In other embodiments, the wire comprises a metal, such as one or more of tungsten, niobium, molybdenum, titanium, zirconium, hafnium, vanadium, tantalum, chromium, iron, ruthenium, cobalt, nickel, rhodium, palladium, rhenium, osmium, iridium, platinum, gold, lead, and gadolinium. The waveguide may be substantially thermally isolated from portions of the reactor core, such as by surrounding at least a portion of the waveguide with a thermal insulation material. The waveguide may be exposed to nuclear conditions, such as one or more of neutrons, alpha particles, beta particles, and gamma particles within the reactor. Accordingly, the thermal insulation material may provide thermal insulation without substantially comprising a radiation moderator (e.g., a neutron moderator (neutron capturing material), a gamma moderator). The waveguide may extend through a length of the reactor core.

Responsive to exposure to conditions within the reactor core, the waveguide may self-heat, such as responsive to exposure of the waveguide to one or both of neutrons and gamma particles within the reactor core. The neutrons and/or gamma particles may activate the nuclear fuel material and cause nuclear fission reactions and/or other nuclear heating with the waveguide that, in turn, may heat the waveguide. Ultrasonic waves generated by the ultrasonic transducer may propagate through the waveguide. The speed of the ultrasonic waves through the waveguide may be based on the mechanical properties (e.g., the modulus of elasticity) of the waveguide, and the temperature of the waveguide. Accordingly, responsive to the time of flight of the acoustic waves and the duration between reflected acoustic waves detected by the transducer, a temperature profile of the waveguide may be determined. In addition, since the waveguide may be substantially thermally isolated from the reactor core, one or more of a neutron flux, a neutron spectra, and a gamma flux within the reactor core may be estimated, since heating of the waveguide may be based substantially on the response of the materials within the waveguide to conditions within the reactor (e.g., fission of materials within the waveguide).

FIG. 1 is a simplified schematic of an ultrasonic sensor 100, in accordance with embodiments of the disclosure. The ultrasonic sensor 100 includes a lead-in cable 102 including conductors for providing power to various components of the ultrasonic sensor 100 and further configured to communicate one or more signals from various components of the ultrasonic sensor 100 to, for example, a control system 104. The lead-in cable 102 may be coupled to the transducer 110 at location 134, such as by a laser weld. The lead-in cable 102 may be in electrical communication with a transducer 110, which may comprise, for example, an ultrasonic transducer. The transducer 110 may be in operable communication with a waveguide 120, which may extend from the transducer 110 and into a reactor core. The waveguide 120 may be housed within a sheath 130. In some embodiments, a thermal insulation material 140 is disposed between the outside of the waveguide 120 and the inner diameter of the sheath 130.

The lead-in cable 102 may have a diameter $D_1$ between about 6.35 mm (about 0.250 inch) and about 12.7 mm (about 0.500 inch). In some embodiments, the diameter $D_1$ of the lead-in cable 102 is about 1.0 mm. However, the disclosure is not so limited and the diameter $D_1$ of the lead-in cable 102 may be different than that described. A length $L_1$ of the lead-in cable 102 (e.g., which may be configured to extend from a location outside a reactor core and to the transducer 110) may depend on a configuration of a reactor or reactor core in which at least a portion of the ultrasonic sensor 100 is disposed. By way of nonlimiting example, the length $L_1$ may be between about, for example, 30.5 cm (about 1.0 foot) and about 610 cm (about 20 feet), such as between about 30.5 cm and about 100 cm, between about 100 cm and about 200 cm, between about 200 cm and about 300 cm, between about 300 cm and about 400 cm, or between about 400 cm and about 610 cm. However, the disclosure is not so limited and the length $L_1$ may be more or less than the lengths described above, depending on a particular configuration and geometry (e.g., of the reactor core) in which the ultrasonic sensor 100 is utilized.

The transducer 110 may be configured to generate acoustic waves, such as acoustic waves in the ultrasonic frequency range. The transducer 110 may comprise an ultrasonic transceiver configured to convert an electrical signal into acoustic waves which are transmitted to and propagated through the waveguide 120. The transducer 110 may further be configured to convert reflected acoustic waves from the waveguide 120 into an electrical signal.

With reference to FIG. 2, the transducer 110 may include a housing 115 in which a magnetostrictive wire 112 is located (e.g., housed, contained). In some embodiments, the housing 115 comprises a magnetic material. The magnetostrictive wire 112 may be operably coupled to the waveguide 120, such as by a laser weld at location 124. In other embodiments, the magnetostrictive wire 112 is operably coupled to the waveguide 120 by other means. A magnetizing coil 114 may be wrapped around the magnetostrictive wire 112. In some embodiments, a bobbin 116 may surround at least a portion of the magnetostrictive wire 112 and the magnetizing coil 114 may be wrapped around the bobbin 116. The bobbin 116 may comprise, for example, alumina.

In some embodiments, the magnetostrictive wire 112 comprises iron, gallium, cobalt, nickel, another material, and combinations thereof. In some embodiments, the magnetostrictive wire 112 comprises an alloy of iron and gallium. In other embodiments, the magnetostrictive wire 112 comprises an alloy of iron and cobalt. However, the disclosure is not so limited and the magnetostrictive wire 112 may comprise other materials exhibiting magnetostriction.

The magnetizing coil 114 may comprise a metal material, such as, for example, silver, palladium, another metal, or combinations thereof. In some embodiments, the magnetizing coil 114 comprises an alloy of silver and palladium. As will be understood, an electric current may be passed through the magnetizing coil 114 to generate a magnetic field, which, in turn, may strain the magnetostrictive wire 112 and generate an acoustic wave at a frequency corresponding to a frequency at which the transducer 110 is driven.

Although the transducer 110 has been described as comprising a magnetostrictive transducer 110, the disclosure is not so limited. In other embodiments, the transducer 110 comprises a piezoelectric transducer. In some such embodiments, the transducer 110 comprises a piezoelectric material formulated and configured to exhibit a mechanical stress responsive to exposure to an electric current, which may, in turn, generate acoustic waves at a frequency at which the piezoelectric transducer is driven. The acoustic waves are translated from the transducer 110 to the waveguide 120.

The transducer 110 may have a diameter $D_2$ (FIG. 1) sufficient to house components thereof. In some embodiments, the diameter $D_2$ is greater than the diameter $D_1$ of the lead-in cable 102. The diameter $D_2$ of the transducer 110 may be between about 4.0 mm and about 1.0 mm, such as between about 4.0 mm and about 6.0 mm, between about 6.0 mm and about 8.0 mm, or between about 8.0 mm and about 10.0 mm, however, the disclosure is not so limited. In some embodiments, the diameter $D_2$ is about 6.5 mm. Similarly, a length $L_2$ of the transducer 110 may be sufficient to house components thereof. In some embodiments, the length $L_2$ is between about 50 mm and about 150 mm, such as between about 50 mm and about 100 mm, or between about 100 mm and about 150 mm, however, the disclosure is not so limited.

With reference again to FIG. 1, the waveguide 120 may be in operable communication with the housing 115, such as at coupling 122, which may be welded (e.g., such as by a laser weld) to the waveguide 120 at location 132. The waveguide 120 may be operably coupled to the magnetostrictive wire 112 at location 124, which may also comprise, for example, a laser weld, as described above.

The waveguide 120 may comprise at least one metal material, which may be formulated and configured to withstand temperatures within a reactor core. By way nonlimiting example, the waveguide 120 may comprise tungsten, niobium, molybdenum, titanium, zirconium, hafnium, vanadium, tantalum, chromium, iron, ruthenium, cobalt, nickel, rhodium, palladium, rhenium, osmium, iridium, platinum, gold, lead, and gadolinium. In some embodiments, the waveguide 120 further comprises at least one additional material, such as a fissile material. Nonlimiting examples of fissile materials include one or more of transuranic materials (e.g., uranium-235, thorium, plutonium-239, thorium-232), lithium-6, boron-10. The at least one additional material may be alloyed with the at least one metal material.

An atomic percent of the at least one additional material may vary depending on the composition thereof and the environment in which the ultrasonic sensor 100 is used. For example, depending on a neutron flux of the reactor core in which the ultrasonic sensor 100 is disposed, the atomic percent of the at least one additional material may be varied (e.g., the atomic percent of the at least one additional material may be less in embodiments where the ultrasonic sensor 100 is disposed in a reactor having a relatively higher neutron flux compared to other reactor cores). The atomic percent of the at least one additional material may be from about 0.1 atomic percent to about 100 atomic percent, such as from about 0.1 atomic percent to about 1.0 atomic percent, from about 1.0 atomic percent to about 2.0 atomic percent, from about 2.0 atomic percent to about 4.0 atomic percent, from about 4.0 atomic percent to about 6.0 atomic percent, from about 6.0 atomic percent to about 8.0 percent, from about 8.0 atomic percent to about 10 atomic percent, from about 10 atomic percent to about 20 atomic percent, from about 20 atomic percent to about 30 atomic percent, from about 30 atomic percent to about 40 atomic percent, from about 40 atomic percent to about 60 atomic percent, from about 60 atomic percent to about 80 atomic percent, or from about 80 atomic percent to about 100 atomic percent. In some embodiments, a remaining portion of the waveguide 120 comprises the at least one metal.

In some embodiments, the waveguide comprises uranium-235 and nickel. In other embodiments, the waveguide 120 comprises uranium-235 and zirconium. The uranium may comprise, for example, natural uranium having, for example, about 0.71 atomic percent uranium-235 and about 99.38 atomic percent uranium-238. In other embodiments, the uranium may comprise depleted uranium (DU) comprising, for example, a uranium alloy having less than about 0.3 atomic percent uranium-235. In yet other embodiments, the uranium comprises low enriched uranium (e.g., having greater than about 0.71 atomic percent uranium-235 and less than about 20.0 atomic percent uranium-235). In further embodiments, the uranium comprises highly enriched uranium (e.g., having greater than about 20.0 atomic percent uranium-235).

In some embodiments, where the at least one additional material comprises a transuranic material, the waveguide 120 may be formulated and configured to facilitate determination of a neutron flux and a neutron spectra within the reactor core in which the ultrasonic sensor 100 is disposed. By way of nonlimiting example, since the waveguide 120 is substantially thermally isolated from an external environment via the thermal insulation material 140, any change (e.g., increase) in temperature of the waveguide 120 may be due to nuclear heating (fission heating, gamma heating) of the waveguide 120 caused by the materials (e.g., fissile materials, metals) constituting the waveguide 120. By way of nonlimiting example, where the waveguide 120 comprises fissile materials, the waveguide 120 may be heated, at least in part, by fission heating of the fissile materials within the waveguide 120. In some such embodiments, the heating of the waveguide 120 may be correlated to the neutron flux and/or neutron spectra proximate the waveguide 120 (e.g., within the reactor core).

In other embodiments, the waveguide 120 comprises a material formulated and configured to be heated by means of gamma radiation. In some such embodiments, the waveguide 120 comprises one or more of tungsten, niobium, molybdenum, titanium, zirconium, hafnium, vanadium, tantalum, chromium, iron, ruthenium, cobalt, nickel, rhodium, palladium, rhenium, osmium, iridium, platinum, gold, lead, and gadolinium. In some such embodiments, heating of the waveguide 120 may be caused, at least in part, by exposure of the waveguide 120 to gamma radiation. The heating of the waveguide 120 may be correlated to the gamma flux proximate the waveguide 120 (e.g., within the reactor core).

In some embodiments, the at least one additional material comprises a fertile material, meaning that the at least one additional material may be converted to a fissile material by neutron absorption and subsequent nuclei conversions. By way of nonlimiting example, the fertile material may include thorium-232, uranium-234, uranium-238, plutonium-242, uranium-236, americium-241, another material, or combinations thereof.

In some embodiments, the at least one additional material comprises a material formulated and configured to undergo alpha decay. Such materials may include, by way of nonlimiting example, boron, lithium, another material, or combinations thereof. In some embodiments, the at least one additional material comprises lithium-6 or boron-10. In embodiments where the at least one additional material comprises a material formulated and configured to undergo alpha decay, the ultrasonic sensor 100 may be sensitive to a different spectra of nuclear environment than in embodiments where the at least one additional material comprises a transuranic material. Stated another way, use of at least one material in the waveguide 120 comprising a material formulated and configured to undergo alpha decay may facilitate real-time spectral analysis of alpha decay within the reactor core.

It is contemplated that, in at least some embodiments, the waveguide 120 includes at least one metal, at least one fissile transuranic material, and at least one other material formulated and configured to exhibit a change responsive to gamma radiation. In some such embodiments, the ultrasonic sensor 100 may be configured to determine a presence of fission reactions, such as fission of one or more transuranic elements, and an indication of gamma decay.

With continued reference to FIG. 1, a length $L_3$ of the waveguide 120 may be between about 100 mm and about 10,000 mm, such as between about 100 mm and about 500 mm, between about 500 mm and about 1,000 mm, between about 1,000 mm and about 2,500 mm, between about 2,500 mm and about 5,000 mm, or between about 5,000 mm and about 10,000 mm.

FIG. 3 is a simplified longitudinal cross-sectional view of the waveguide 120, in accordance with embodiments of the disclosure. In some embodiments, the waveguide 120 comprises one or more features configured to exhibit echogenic properties. By way of nonlimiting example, walls of waveguide (corresponding to the diameter of the waveguide 120) may include one or more internal anomalies, which may be characterized as notches 126 (indentations, reductions in diameter, grooves, etc.). The notches 126 may comprise regions where a diameter of the waveguide 120 is locally reduced. In some embodiments, the notches 126 exhibit a semicircular shape when viewed from the longitudinal cross-section of FIG. 3. In other embodiments, the notches 126 exhibit a triangular shape (e.g., a v-shape). In some embodiments, a size and shape of the notches 126 may be different. Stated another way, in some such embodiments, a size and shape of at least one of the notches 126 may be different than a size and shape of at least others of the notches 126. In yet other embodiments, a size and shape of the notches 126 may be substantially the same.

With continued reference to FIG. 3, the wall of waveguide 120 may further include one or more apertures 128 extending therethrough. The apertures 128 may have a diameter between about 0.10 mm and about 0.25 mm, although the disclosure is not so limited. In some embodiments, the waveguide 120 includes only one of notches 126 or apertures 128 and does not include the other of the notches 126 or the apertures 128. In other embodiments, the waveguide 120 includes a plurality of notches 126 and a plurality of apertures 128.

A spacing between adjacent notches 126 and adjacent apertures 128 may be at least about 2.5 cm. Stated another way, a distance between one of a notch 126 and an aperture 128 and an adjacent feature (e.g., notch 126 or aperture 128) may be at least about 2.5 cm. Such spacing may reduce interference due to adjacent features (e.g., notches 126 and apertures 128).

By way of nonlimiting example, the spacing between adjacent notches 126 and adjacent features (e.g., other notches 126 or apertures 128) may be between about 2.5 cm and about 100 cm, such as between about 2.5 cm and about 10 cm, between about 10 cm and about 30 cm, between about 30 cm and about 50 cm, or between about 50 cm and about 100 cm, although the disclosure is not so limited. Similarly, a spacing between adjacent apertures 128 and adjacent features (e.g., other apertures 128 or notches 126) may be between about 2.5 cm and about 100 cm, such as between about 2.5 cm and about 10 cm, between about 10 cm and about 30 cm, between about 30 cm and about 50 cm, or between about 50 cm and about 100 cm, although the disclosure is not so limited.

The notches 126 and the apertures 128 may be located at locations of the waveguide 120 where it is desired to determine a temperature of the waveguide 120. In other words, the notches 126 and apertures 128 may facilitate measurement of a temperature of the waveguide 120 proximate the locations of the notches 126 and the apertures 128.

Referring again to FIG. 1, the sheath 130 may comprise a suitable material to provide support to and house the waveguide 120. The sheath 130 may comprise, for example, a stainless steel material, an austenitic nickel-chromium alloy (such as Inconel), another material, and combinations thereof. In some embodiments, the sheath 130 comprises stainless steel.

The thermal insulation material 140 may be configured to thermally insulate the waveguide 120 from an external environment, such as from a reactor core. The thermal insulation material 140 may include a ceramic material. In some embodiments, the thermal insulation material 140 comprises a ceramic oxide. By way of nonlimiting example, the thermal insulation material 140 may include magnesium oxide, zirconium oxide, silicon dioxide, another oxide, or combinations thereof. In some embodiments, the thermal insulation material 140 has a porous structure. Presence of the thermal insulation material 140 may improve an accuracy of the ultrasonic sensor 100 by minimizing heat losses from the waveguide 120 to an external environment.

In use and operation, the transducer 110 may provide ultrasonic waves to the waveguide 120 at a frequency. The ultrasonic waves may propagate through the waveguide 120 and at least a portion of the ultrasonic waves may be reflected by portions of the waveguide 120, such as by one or more of the notches 126 (FIG. 3) or apertures 128 (FIG. 3). The reflected ultrasonic waves may propagate through the waveguide 120 back to the transducer 110, where the transducer 110 converts the ultrasonic waves to an electrical signal. The electrical signal is received by the control system 104, which includes software to process the electrical signals and determine a temperature of the waveguide 120 and a temperature profile along the length of the waveguide 120.

The temperature at different locations along the waveguide 120 may be determined based on the locations of the notches 126 and the apertures 128 and the temperature of the waveguide 120.

Based on the spacing in time between the electrical signal representative of the reflected acoustic waves (e.g., the time of flight of the ultrasonic pulse wave) and the locations of the notches 126 and the apertures 128, the temperature profile of the waveguide 120 may be determined with the control system 104. For example, since the speed of the acoustic waves within the waveguide 120 is dependent on the temperature thereof, the time of flight of the acoustic waves may be correlated to the temperature of the waveguide 120. In some embodiments, the time interval between two adjacent echoes is evaluated and compared to a calibration curve to give the average temperature in the waveguide 120 corresponding to the location where the echo was generated (i.e., a respective notch 126 or aperture 128).

Based on the temperature profile of the waveguide 120, one or more nuclear properties proximate the waveguide 120 and the ultrasonic sensor 100 may be determined. For example, since the waveguide 120 is thermally insulated from an external environment by the thermal insulation material 140, changes in temperature of the waveguide 120 may be attributed to self-heating of the waveguide 120. Self-heating of the waveguide 120 may be due to one or more of fission of components of the waveguide 120 (e.g., fission of a transuranic material), gamma decay or another process. As one example, where the waveguide 120 comprises uranium-235, heating of the waveguide 120 may be due to fission of the uranium-235. As another example, the waveguide 120 may be heated by alpha decay of, for example, boron-10 or lithium-6 located within the waveguide 120.

In some embodiments, the temperature of the waveguide 120 may be correlated to a neutron flux and a neutron spectra in the environment proximate the waveguide 120. Since the transducer 110 receives the reflected acoustic waves and creates a corresponding electrical signal in real time, the neutron flux and neutron spectra may be determined in real time. In some embodiments, the ultrasonic sensor 100 is configured to determine a gamma flux in real time and/or during transient conditions. Accordingly, the ultrasonic sensor 100 may be used to determine conditions proximate the ultrasonic sensor 100 during transient conditions and may be used in reactor cores exhibiting transient conditions. The ultrasonic sensor 100 may be useful in determining operating conditions of a reactor core during start-up, shut-down, and during emergency situations.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. An ultrasonic sensor, comprising:
    a transducer in operable communication with a power source;
    a waveguide comprising one or more of at least one metal, at least one fissile material, and at least one fertile material in operable communication with the transducer and configured to propagate acoustic waves generated by the transducer, the transducer configured to convert reflected acoustic waves to an electric signal;
    a thermally insulative material proximate the waveguide; and
    a control system in operable communication with the transducer, the control system configured to determine at least a temperature of the waveguide based on the reflected acoustic waves and, based on the determined temperature of the waveguide, determine one or more types of nuclear radiation proximate the waveguide.

2. The ultrasonic sensor of claim 1, wherein the waveguide comprises uranium.

3. The ultrasonic sensor of claim 1, wherein the transducer comprises one of a magnetoresistive transducer and a piezoelectric transducer.

4. The ultrasonic sensor of claim 1, wherein the waveguide comprises one or more echogenic features along a length thereof.

5. The ultrasonic sensor of claim 4, wherein the one or more echogenic features comprises one or both of apertures and notches.

6. The ultrasonic sensor of claim 1, wherein the waveguide comprises at least one of boron and lithium.

7. The ultrasonic sensor of claim 1, wherein the waveguide comprises tungsten.

8. The ultrasonic sensor of claim 1, wherein the thermally insulative material comprises a ceramic material.

9. The ultrasonic sensor of claim 1, wherein the waveguide comprises one or more of tungsten, niobium, molybdenum, titanium, zirconium, hafnium, vanadium, tantalum, chromium, iron, ruthenium, cobalt, nickel, rhodium, palladium, rhenium, osmium, iridium, platinum, gold, lead, and gadolinium.

10. The ultrasonic sensor of claim 1, wherein the control system is further configured to determine a temperature gradient along a length of the waveguide.

11. The ultrasonic sensor of claim 1, wherein the waveguide comprises one or more of lithium-6, beryllium-8, boron-10, platinum-175, and uranium-238.

12. The ultrasonic sensor of claim 1, wherein the waveguide comprises one or more of tungsten, zirconium, and nickel.

13. The ultrasonic sensor of claim 1, wherein the transducer comprises a magnetostrictive wire surrounded by a magnetizing coil.

14. A method of measuring at least one nuclear property within a reactor core, the method comprising:
    pulsing acoustic waves from a transducer through a waveguide in operable communication with the transducer and comprising one or more of at least one metal, at least one fissile material, and at least one fertile material, the waveguide configured to propagate acoustic waves generated by the transducer, the transducer in operable communication with a power source;
    converting, with the transducer, reflected acoustic waves to an electric signal; and
    determining, with a control system, in operable communication with the transducer, a temperature of the waveguide based on reflected acoustic waves received by the transducer and, based on the determined temperature of the waveguide, determine one or more types of nuclear radiation proximate the waveguide.

15. The method of claim 14, wherein pulsing acoustic waves through a waveguide comprises pulsing acoustic waves through a waveguide comprising uranium.

16. The method of claim 14, wherein pulsing acoustic waves through a waveguide comprises pulsing acoustic waves through a waveguide comprising one or more of tungsten, niobium, molybdenum, titanium, zirconium, hafnium, vanadium, tantalum, chromium, iron, ruthenium, cobalt, nickel, rhodium, palladium, rhenium, osmium, iridium, platinum, gold, lead, and gadolinium.

17. The method of claim 14, wherein determining one or more types of nuclear radiation proximate waveguide comprises determining at least one of a neutron flux and at least one neutron spectrum based on the determined temperature.

18. The method of claim 14, wherein determining one or more types of nuclear radiation proximate the waveguide comprises determining a gamma flux based on the determined temperature.

19. The method of claim 14, wherein pulsing acoustic waves from a transducer comprises pulsing acoustic waves from a magnetoresistive transducer.

20. The method of claim 14, wherein pulsing acoustic waves from a transducer through a waveguide comprises pulsing the acoustic waves through a waveguide surrounded by a ceramic material.

* * * * *